Patented Apr. 27, 1926.

1,582,775

UNITED STATES PATENT OFFICE.

CARL OECHSLIN, OF ABLON, FRANCE, ASSIGNOR TO ETABLISSEMENTS POULENC FRÈRES, OF PARIS, FRANCE.

PROCESS FOR THE PREPARATION OF HYDROXY ALIPHATIC ARSONIC ACIDS.

No Drawing.   Application filed October 25, 1923. Serial No. 670,796.

*To all whom it may concern:*

Be it known that I, CARL OECHSLIN, a citizen of the Swiss Confederation, and a resident of Ablon, Seine and Oise, Republic of France, have invented certain new and useful Improvements in Processes for the Preparation of Hydroxy Aliphatic Arsonic Acids, of which the following is a specification.

This invention relates to a process of preparation of hydroxy aliphatic arsonic acids.

I have discovered that if any compound containing the so-called ethylene oxide group

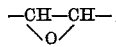

be treated with a solution of an alkaline arsenite, a hydroxy aliphatic arsonic acid is obtained.

The general reaction involved may be represented as follows:—

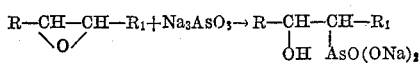

in which R may be either an aliphatic or an aromatic radical, such as $CH_3$, $C_6H_5$, etc., and $R_1$ a functional group such as OH, COOH, etc.

It is thus possible to obtain aliphatic arsonic acids containing not only the hydroxyl group generated by the rupture of the ethylene oxide ring, but additional substituent groups as well, according to the nature of the ethylene oxide compound employed. These latter substituent groups are, needless to say, always connected to the arsonic acid group through the aliphatic chain.

As a general rule, in these reactions, the proportions of the reacting substances, as well as the temperature, may be varied through fairly wide limits without materially changing the course of the reaction involved.

*Example I.*—To 100 grams of arsenious acid dissolved in 360 cc. of 33% sodium hydroxide solution, is added 74 grams of epihydrin alcohol

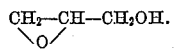

The mixture is warmed to about 80° C. with vigorous stirring. When the reaction is complete, the solution is neutralized with hydrochloric acid, oxidized with hydrogen peroxide, and the uncombined arsenious acid subsequently precipitated with magnesia mixture. Upon the addition of barium solution, a white precipitate is formed which, after purification, corresponds to the barium salt of the acid represented by the formula:—

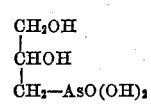

*Example II.*—To 50 grams of arsenious acid dissolved in 210 cc. of 33% sodium hydroxide solution, is added, little by little, with stirring 44 grams of ethylene oxide carboxyl acid

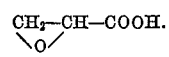

When the reaction is finished, the solution is neutralized with hydrochloric acid, hydrogen peroxide is added, and the uncombined arsenious acid removed as before with magnesia mixture. By precipitation of its barium salt, an acid is obtained corresponding to the following formula:—

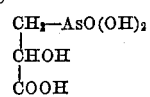

I have observed that this method is of equally successful application if, instead of the ethylene oxide compound, its parent substance, the halogen-hydrin, is employed. Thus, α-oxy-β-chloro-propionic acid, which, by removal of a molecule of hydrogen chloride, yields ethylene oxide carboxylic acid (see Example II above), may itself be converted by this method into a hydroxy aliphatic arsonic acid.

*Example III.*—To 50 grams of arsenious acid dissolved in 210 cc. of 33% sodium hydroxide solution, is added, with stirring, 63 grams of α-oxy-β-chloro-propionic acid ($CH_2Cl$-$CHOH$-$COOH$). The temperature is maintained at 80° C. for a short time to complete the reaction. The resulting solution is then treated as related in the preceding examples, the arsonic acid being isolated in the form of its barium salt. The free acid has the formula:—

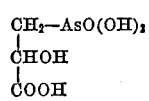

*Example IV.*—Instead of using the halogen-hydrin acid, the corresponding nitrile may be employed, thus:—

To 50 grams of arsenious acid dissolved in 210 cc. of 33% sodium hydroxide solution, is added, with stirring, 53 grams of α-oxy-β-chloro-propionitrile (CH$_2$Cl-CHOH-CN). The temperature is maintained at 80° C. for a short time, and the free acid is subsequently isolated as before. The product of this reaction is the same as that obtained in Example III.

I claim:—

The method of preparing hydroxy aliphatic arsonic acids which consists in treating aliphatic compounds containing the ethylene oxide grouping

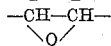

with a solution of an alkaline metal arsenite, and isolating the free acid substantially as hereinbefore described.

CARL OECHSLIN.